United States Patent [19]

Newman

[11] Patent Number: 5,535,503
[45] Date of Patent: Jul. 16, 1996

[54] STATOR LEAD WIRE CONNECTION METHOD AND APPARATUS

[75] Inventor: Lawrence E. Newman, Tipp City, Ohio

[73] Assignee: Globe Products Inc., Huber Heights, Ohio

[21] Appl. No.: 162,414

[22] Filed: Dec. 3, 1993

[51] Int. Cl.⁶ ........................................... H02K 15/09
[52] U.S. Cl. ................... 29/596; 29/597; 29/598; 242/432.2; 242/432.6; 310/42; 310/71
[58] Field of Search .......................... 29/596, 597, 598, 29/732, 736; 310/42, 71; 242/7.03, 7.05 B, 7.05 A

[56] References Cited

U.S. PATENT DOCUMENTS

| | | |
|---|---|---|
| 3,984,908 | 10/1976 | Ackley . |
| 4,038,573 | 7/1977 | Hillyer et al. . |
| 4,074,418 | 2/1978 | Pearsall . |
| 4,166,265 | 8/1979 | Reynolds et al. . |
| 4,951,379 | 8/1990 | Clemenz ................................. 29/598 |
| 5,065,503 | 11/1991 | Luciani et al. . |
| 5,090,107 | 2/1992 | Beakes et al. . |
| 5,090,108 | 2/1992 | Banner et al. . |
| 5,099,568 | 3/1992 | Santandrea . |
| 5,214,838 | 6/1993 | Beakes et al. . |
| 5,245,748 | 9/1993 | Luciani et al. . |
| 5,361,487 | 11/1994 | Luciani et al. ............................ 29/596 |
| 5,392,506 | 2/1995 | Luciani et al. . |

OTHER PUBLICATIONS

See accompanying Information Disclosure Statement regarding manual lead wire connection method.

*Primary Examiner*—Carl E. Hall
*Attorney, Agent, or Firm*—Roger S. Dybvig

[57] ABSTRACT

To produce a slack condition in a lead wire that extends from a stator coil to a terminal receptacle mounted on the stator core, the lead wire is bent over a wire guide finger adjacent the terminal receptacle. This increases the length of the lead wire segment between the coil and the terminal receptacle so that the lead wire will be somewhat slack. This also materially decreases the tension on the lead wire where it enters the receptacle, and avoids the abrupt, wire-weakening, right-angled bend resulting from the present practice. A method and an apparatus are provided for appropriately positioning the wire guide finger.

32 Claims, 3 Drawing Sheets

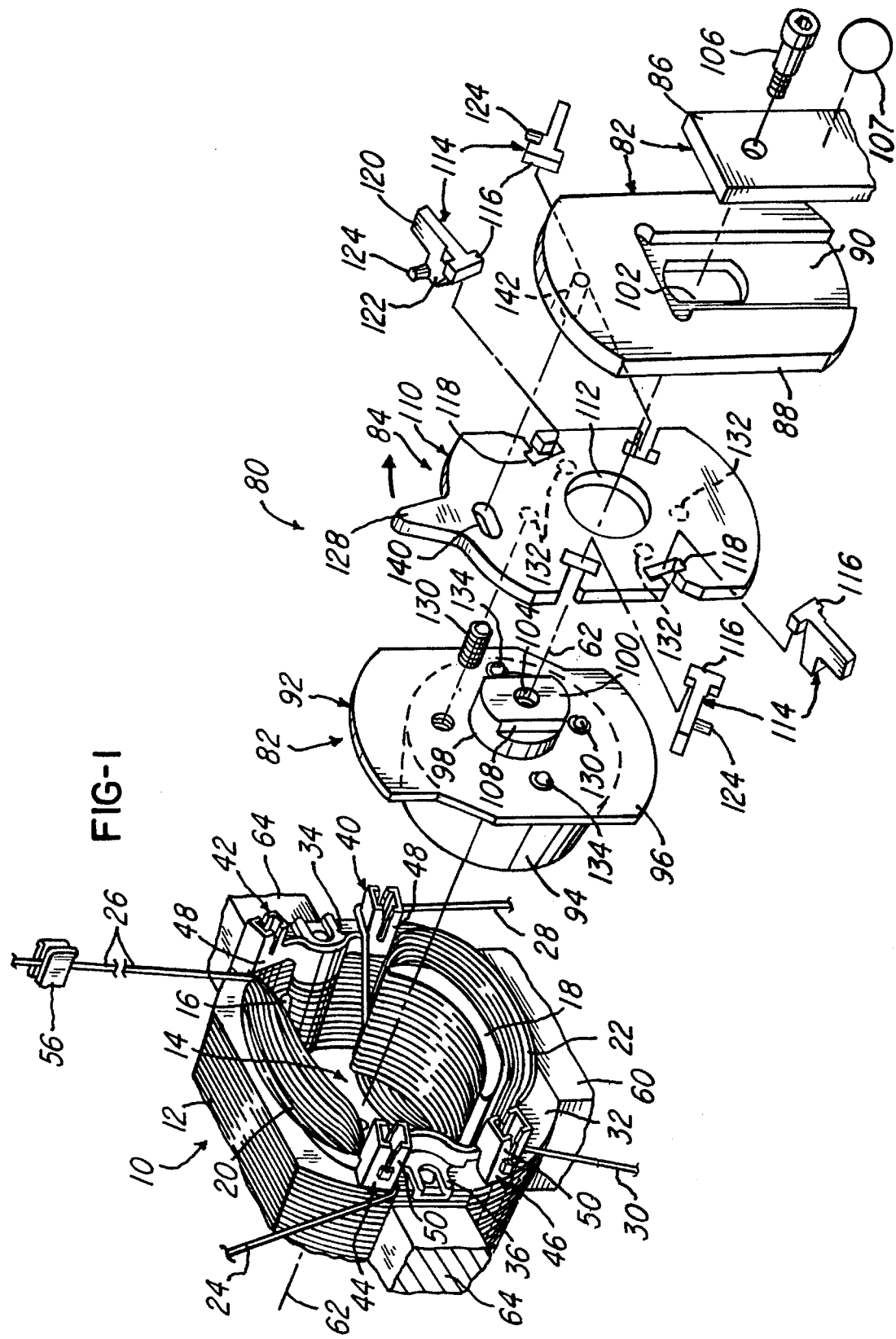

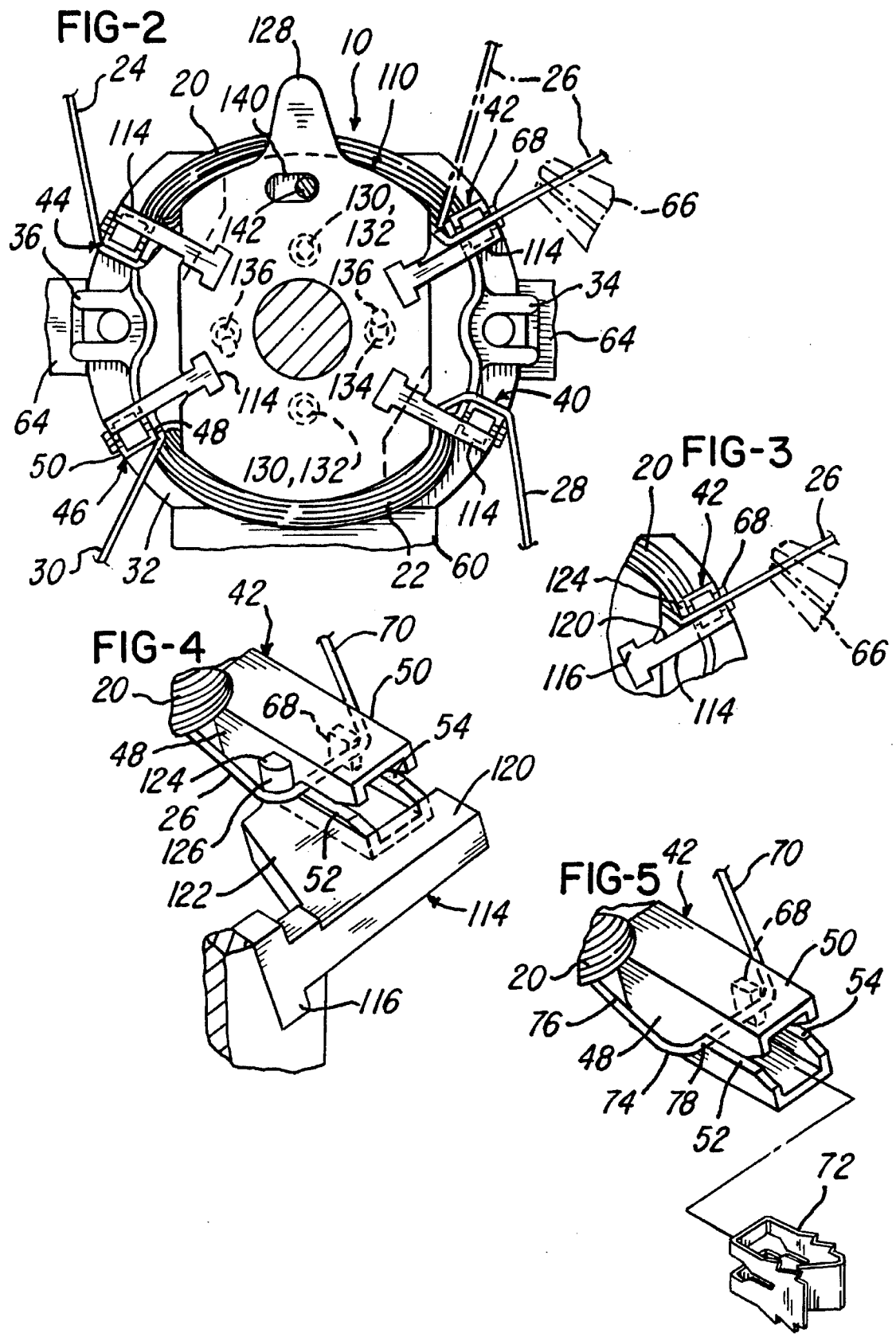

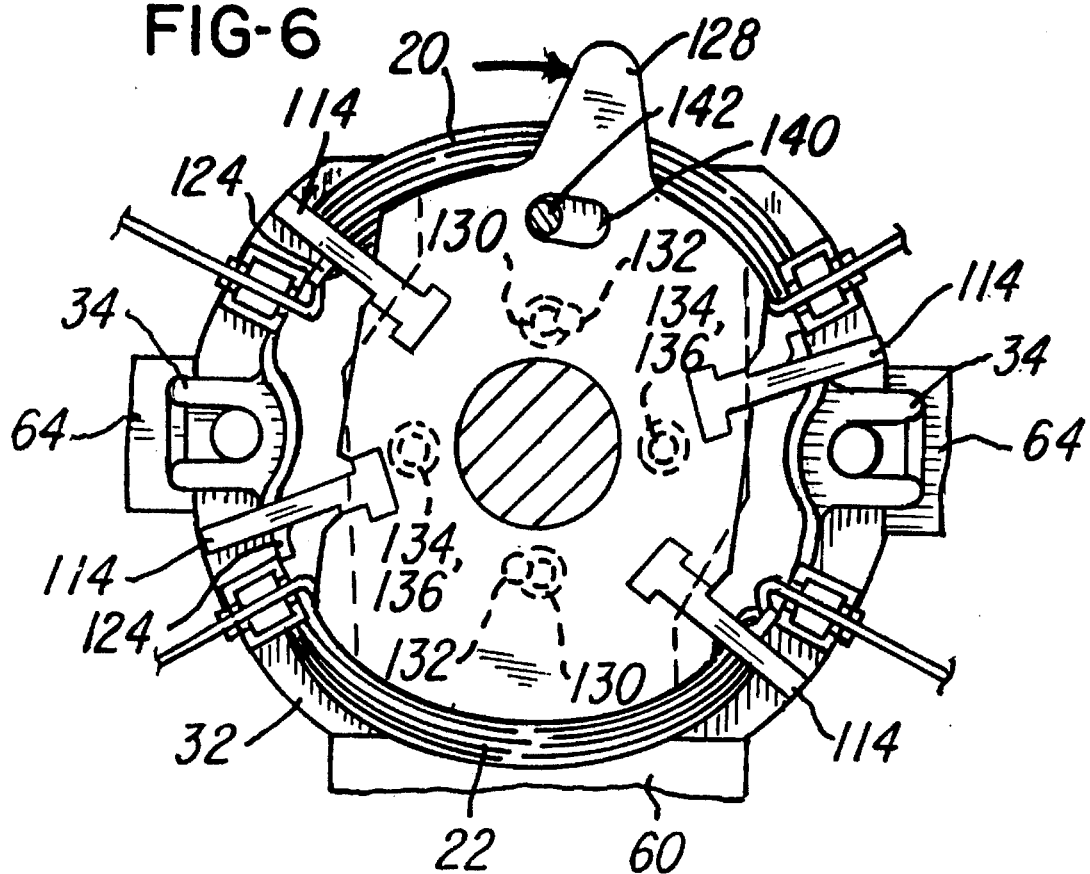
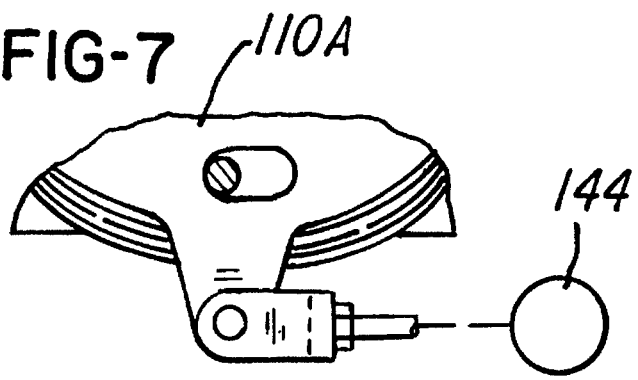

STATOR LEAD WIRE CONNECTION METHOD AND APPARATUS

FIELD OF THE INVENTION

This invention relates to the art of manufacturing stators for electric motors and more particularly to a stator coil lead wire connection method and apparatus.

BACKGROUND OF THE INVENTION

When manufacturing stators having a stator core on which are mounted terminal boards with terminal-receiving receptacles having slots in which the lead wires are to be placed, it has become a common practice to position a stator at a lead connect station and, using a robot end effector, to manipulate the stator coil lead wires to insert them into the receptacle slots. The lead wires, which extend substantially axially of the stator core are bent to extend essentially radially of the stator core when they are inserted into the receptacle slots. Each lead wire is thereby bent at an essentially right angle over a sharp corner at the bottom of a receptacle slot.

The wire at the bending point is under considerable tension because the grip on the end effector against the wire must be sufficiently secure that the lead wire is invariably pulled completely down to the bottoms of the receptacle slots. The sharp bend and tension creates a weakened spot in the lead wire. These factors may be exacerbated when the terminal is inserted into the receptacle. As a result, there is an increased potential for the lead wire to break at this point, especially when the stator is exposed to substantial vibrations during use, such as in a power tool.

In order to overcome the weakness in a lead wire at the point it enters the receptacle, it has been suggested that the stator be so manufactured that the segment of each lead wire extending from the coil to its associated receptacle be made somewhat slack in order to decrease the tension on the wire where it enters the receptacle. So far as known, a satisfactory method and apparatus for providing slackened lead wires have not been developed. The task is not easy because any such method and apparatus, to be satisfactory for use in a mass production manufacturing environment, must be rugged, reliable, and so fast acting that it will not significantly increase the time needed to manufacture the stator.

SUMMARY OF THE INVENTION

The primary object of this invention is to provide a method and apparatus which would create a slack lead wire as described above. In order to provide a slack wire condition, each lead wire is gradually bent before it enters its associated receptacle slots and a short segment thereof adjacent the inner side wall of the receptacle extends substantially radially of the bore of the stator. These measures increase the length of a lead wire segment between a coil and its terminal receptacle so that the lead wire will be somewhat slack. Thus, the tension on the lead wire where it enters the receptacle is materially decreased. In addition, the abrupt, wire-weakening, right-angled bend resulting from the present practice is avoided.

In accordance with this invention, wire guide fingers are positioned adjacent one of the receptacles in the paths of the lead wires to be inserted therein. The fingers have arcuate surfaces over which the lead wires are coursed so that they are gradually curved rather than abruptly bent, and so that they approach entry into the receptacles in a radial rather than an axial direction.

Further in accordance with this invention, a tooling assembly including the fingers is provided that includes a fixed subassembly and a rotatable subassembly from which the fingers project and which is mounted on the fixed subassembly. A drive mechanism moves the tooling assembly between a first position in which the fingers are within the bore of the stator and a second position in which the fingers are retracted from the bore of the stator. Means are provided for rotating the rotatable subassembly when the fingers are within the bore of a stator as needed to circumferentially align or misalign the fingers with the receptacles. When the fingers are circumferentially aligned with the receptacles, a robot end effector sequentially inserts each of the lead wires into their respective terminal receptacles. Afterwards, the rotatable assembly is rotated to remove the fingers from between the lead wires and the receptacles, the tooling assembly retracted, and the stator removed from the lead connect station.

The rotatable assembly is preferably rotated by the end effector between detented positions but may be rotated by an air actuator.

Other objects and advantages will become apparent from the following description and the drawings.

BRIEF DESCRIPTION OF THE DRAWINGS

FIG. 1 is a partly exploded, fragmentary, partly schematic, perspective view of a lead connect station of a stator winding machine which includes a presently preferred tooling assembly in accordance with this invention, a stator with which this invention may be used, and a stator supporting structure.

FIG. 2 is a fragmentary, end elevational view, with parts in cross section, of the stator and a portion of the tooling assembly of FIG. 1. FIG. 2 also illustrates by phantom lines a robot end effector used with this invention in the process of inserting a lead wire into a terminal receptacle.

FIG. 3 is a fragmentary, end elevation view of a portion of FIG. 2, illustrating a later stage in the insertion of the lead wire into the terminal receptacle.

FIG. 4 is a fragmentary perspective view, on a scale larger than the preceding figures, of a portion of the parts of FIG. 2 and 3 after the end effector has completed the insertion of the lead wire into a terminal receptacle.

FIG. 5 is a fragmentary perspective view, on the same scale as FIG. 4, showing the lead wire fully inserted into its receptacle.

FIG. 6 is a view similar to FIG. 2 but at a later stage in the practice of the method of this invention.

FIG. 7 is a fragmentary, partly schematic elevational view illustrating a modification.

DETAILED DESCRIPTION

With reference to FIG. 1, this invention is directed to the manufacture of a stator, generally designated 10, comprising a laminated core 12 formed to include a central bore 14 and pole pieces 16 and 18 around which coils 20 and 22 of magnet wire are wound. Each coil 20 and 22 has a pair of lead wires, designated 24 and 26, and 28 and 30, respectively. Stator core 10 has an end face 32 on which are mounted a pair of terminal boards 34 and 36 provided, respectively, with pairs of axially-extending, terminal-receiving receptacles 40 and 42, and 44 and 46, respectively. Each of the receptacles 40, 42, 44, and 46 comprises a rectangular, open box-like configuration having radially spaced, parallel, inner and outer sidewalls 48 and 50, respectively, which have respective mutually aligned, axially-extending lead wire-receiving slots 52 and 54 (FIG. 5), each of which tapers from a larger dimension at its axially outermost end to a smaller dimension at its innermost end. The innermost ends of the slots 52 and 54 are sized to tightly engage the lead wires extending through them.

In an earlier stage of manufacture of the stator 10, the coils 20 and 22 were wound starting with the lead wires (called start wires) 24 and 28 and finishing with the lead wires (called finish wires) 26 and 30. At the same stage, the lead wires 24, 26, 28 and 30 were inserted into lead wire-retaining clamps 56, only one of which is illustrated in FIG. 1 hereof, which releasably and temporarily hold the lead wires in preparation for later insertion into the receptacles 40, 42, 44 and 46.

This invention is directed primarily to a later stage in the manufacture of the stator 10, which may be termed the "lead-connect" stage, which is carried out at a lead-connect or robot station. This is the station illustrated in FIG. 1. As shown in simplified form in FIG. 1, the stator 10 is supported on a suitable support 60, which may be part of a support track or else a support member on a turret (not shown) and held in a predetermined position with its bore 14 centered on a predetermined axis 62 by clamps 64 or the like. At this stage, a robot having a pliers-like end effector 66 grips a first one of the lead wires, for example lead wire 26, and moves in such a manner as to withdraw the lead wire from the temporary clamp 56, align the lead wire 26 with the slots 52 and 54 of its associated terminal receptacle 42, and then pull the lead wire 26 into the bottoms of the slots 52 and 54 so that the lead wire spans across the middle of the receptacle 42. During these manipulations, the end effector 66 must carry the lead wire 26 in both axial and circumferential directions to bring it into alignment with the receptacle slots 52 and 54 and then in a radial direction to lay the lead wire 26 into the same slots. Radial movement of the end effector 66 continues to the point that the lead wire 26, is laid over an external wire support block 68 (see FIGS. 2 and 3), on the outer face of the receptacle outer side wall 50. The gripping pressure applied by the end effector 66 when the lead wire is being pulled down to the bottoms of the receptacle slots 52 and 54 is adjusted to be sufficient so that the task may be accomplished despite the considerable resistance to insertion of the wire created by the narrow, axially innermost ends of the receptacle slots 52 and 54. After the lead wire 26 is fully inserted into its receptacle slots 52 and 54, a wire cutter (not shown) forming part of the end effector 66 severs the wire lead so that, as shown in FIGS. 4 and 5, only a short tail 70 extends to the outside of the stator 10. These operations are sequentially repeated to insert all of the lead wires 24, 26, 28 and 30, into their respective receptacles.

At a still later stage in the manufacture of the stator 10, as shown diagrammatically in FIG. 5, metal terminals 72 are inserted into the receptacles 40, 42, 44 and 46 in engagement with the lead wires spanning across them. During this operation, the external wire support blocks 68 and the short wire tails 70 may be severed from the receptacles.

The manufacturing procedures as thus far discussed are well known in the industry. A problem that has been encountered with stators manufactured using these procedures is that each lead wire, when inserted into its associated receptacle, is bent at an essentially right angle over the sharp corner at the bottom of the receptacle slot 52 in the receptacle inner side wall 48. The lead wire at this point is under considerable tension because the grip on the end effector 66 against the wire must be sufficiently secure that the lead wire is invariably pulled completely down to the bottoms of the receptacle slots 52 and 54. The sharp bend and tension creates a weakened spot in the lead wire. These factors may be exacerbated when the terminal 72 is inserted into the receptacle. As a result, there is an increased potential for the lead wire to break at this point, especially when the stator is exposed to substantial vibrations during use, such as in a power tool.

In order to overcome the weakness in a lead wire at the point it enters its receptacle, it has been suggested that the segment of each lead wire extending from the coil to its associated receptacle be somewhat slack. A slack lead wire can be achieved by gradually bending the lead wire before it enters its associated receptacle slots so that a short segment of the lead wire adjacent the inner side wall of the receptacle extends substantially radially of the bore of the stator instead of substantially axially as is now the case. Such a lead wire configuration is shown in FIG. 5, wherein the lead wire 26 has, as desired, a gradually rounded corner or bend 74 between its axially extending segment, designated 76, and a short radially-extending segment 78 which extends into the innermost receptacle slot 52. This causes an increase in the length of the lead wire between a coil and its terminal receptacle so that lead wire will be somewhat slack.

With reference to FIGS. 1 and 2, a tooling assembly, generally designated 80, is provided by this invention, which comprises a non-rotatable subassembly, generally designated 82, and a rotatable subassembly, generally designated 84. The non-rotatable subassembly 82 comprises a vertical support arm 86, a tooling backing plate 88 having a relieved rear face 90 which receives the top of the support arm 86, and a nosepiece, generally designated 92. The nosepiece 92 has a conical, forwardly extending arbor 94 adapted to enter into the stator bore 14 to provide support for the coils 20 and 22 during the lead-connect process. Nosepiece 92 further includes a coil-forming plate 96 which can bear against the outer extremities of the coils 20 and 22 to insure that they do not extend beyond a desired distance from the core end face 32, and a generally cylindrical hub 98 that extends from the rear face of the coil forming plate 96 to the support arm 86. For reasons which will become apparent, the hub 98, has a center axis which is coincident with the center axis 62 of the bore of the stator at the lead connect station. The rear end of the hub 98, i.e., the end most remote from the stator 10, is provided with flats that form a rearwardly-extending, generally rectangular boss 100 that projects through a mating, generally rectangular through-bore 102 in the backing plate 88 into engagement with the forward face of the support arm 86. The rear face of the hub 98 has a tapped hole 104 that receives a mounting screw 106 which holds the parts of the non-rotatable subassembly 82 together. Because of the non-circular configurations of the boss 100 and the through-bore 102, relative rotation between the nosepiece 92 and the backing plate 88 is prevented. Of course, the backing plate 88 non-rotatably receives the support arm 86. The support arm 86 itself is non-rotatably mounted for sliding movement on a suitable base (not shown), such as shown, for example, in U.S. Pat. Nos. 5,214,838 and 5,090,108, so that the entire non-rotatable subassembly 82 can move axially toward and away from the stator at the lead-connect station. An air actuator, shown schematically at 106 in FIG. 1, is provided to axially move the non-rotatable assembly 82 for purposes which will be described below.

As shown in FIG. 1, the boss 100 at the rear of the hub 98 is bounded by shoulders 108 which engage the confronting front face of the backing plate 88. Accordingly, the backing plate 88 is spaced from the coil former plate 96 by the length of the circular portion of the hub 98. This spacing is sufficient to provide space for a mounting plate 110 that forms part of the rotatable assembly 84.

With reference to FIGS. 1 and 2, the mounting plate 110 has a circular through-bore 112 by which it is rotatably mounted on the circular portion of the hub 98 between the backing plate 88 and the coil forming plate 96 of the nosepiece 92. In addition to the mounting plate 110, the rotatable assembly 84 includes four circumferentially-spaced guide arms 114, one for use with each terminal receptacle, that project radially with respect to the center axis 62 of the stator bore 14 and outwardly from the side edges of the mounting plate 110. As shown in FIGS. 2 and 6, each guide arm 114 is located generally in axial alignment with one of the terminal receptacles 40, 42, 44, and 46. The guide arms have T-shaped heads 116 which act as keys that fit within mating, T-shaped key slots 118 in the mounting plate 110. The T-shaped keys and slots prevent radial movements of the guide arms 114 away from the mounting plate 110. The confronting surfaces of the nosepiece plate 92 and the backing plate 88 prevent substantial axial movements of the wire guide arms 114 relative to the mounting plate 110. This construction has the advantages of enabling assembly of the rotatable subassembly 84 without the use of fasteners or tools and the parts are relatively inexpensive to machine. Other constructions, including a one-piece rotatable subassembly are possible.

As shown best in FIGS. 3 and 4, each wire guide arm 114 has a radially-extending wire-guiding surface 120 constructed to lie adjacent the outermost opening to the associated receptacle slots 52 and 54 to ensure that the lead wires are guided into the receptacle slots. Of primary importance with respect to the present invention, each of the wire guide arms 114 has an axially extending plate portion 122 (FIG. 4) from which a wire guide finger 124 laterally projects. Each of the wire-guide fingers 124 can be located closely adjacent the inner sidewall 48 of its associated terminal receptacle, and each has an arcuate, outwardly facing surface 126.

With reference to FIG. 4, which shows one of the wire guide fingers 124 after the tooling assembly 80 has been fully advanced toward the stator core, the outermost edge of the arcuate surface 126 is located substantially coplanar with and in circumferential alignment with the bottom or axially innermost end of the inner receptacle slot 52. In operation, which will be more fully discussed below, when a finger 124 is located substantially coplanar with and in substantial circumferential alignment with the bottoms of the receptacle slots 52 and 54, and the robot operated to extend a lead wire into the receptacle slots, the lead wire is necessarily coursed over the outer, arcuate surface 126 of the finger 124 so that, instead of the right-angled bend around the sharp edge of the bottom of the slot that is experienced with present practice, the lead wire is curved around the arcuate outer surface of the finger and extends in a radial direction as it enters into the receptacle. This produces the desired lead wire configuration previously described with reference to FIG. 5. It may be noted that all of the fingers 124 are simultaneously positioned substantially coplanar with and in circumferential alignment with the bottoms of the receptacle slots 52 and 54 so that the robot can be continuously operated to sequentially insert all of the lead wires into their associated receptacles.

In order to enable retraction of the fingers 124 from between the lead wires and the adjacent inner side walls 48 of the terminal receptacles after all of the lead wires have been connected to the receptacles, the rotatable assembly 84 is rotated in a clockwise direction from its position illustrated in FIG. 2 into the position thereof illustrated in FIG. 6. This rotation causes the fingers 124 to be moved circumferentially out of alignment with the receptacle slots 52 and 54 and, correspondingly, causes the fingers 124 to be removed from between the coil lead wires and their associated receptacles. The tooling assembly 80 can now be retracted by operation of the air actuator 107 after which the stator 10 can be removed from the lead connect station and replaced by another stator.

The presently preferred method for rotating the rotatable subassembly 84 is to provide the mounting plate 110 with an upwardly extending lug 128 which can be engaged by the robot end effector 66. Two sets of detent assemblies are provided to frictionally hold the rotatable assembly in one position shown in FIG. 2 or in another position shown in FIG. 6. With reference to FIGS. 1, 2, and 6, one detent assembly comprises a vertically-spaced pair of ball plunger assemblies 130 threadedly received in the nosepiece 92 and a pair of confronting detent recesses 132 in the front face of the mounting plate 110. When the rotatable assembly 84 is in the position shown in FIG. 2, the balls of the ball plungers 130 are frictionally lodged in the recesses 132. When the rotatable assembly is in the position thereof shown in FIG. 6, the ball plungers 130 are out of alignment with the recesses 132.

The second detent assembly includes a pair of horizontally spaced ball plungers 134 and associated detent recesses 136. These are misaligned when the mounting plate 110 is in the FIG. 2 position and aligned when the mounting plate 110 is in the FIG. 6 position. Accordingly, the second detent assembly frictionally holds the mounting plate 110 in the FIG. 6 position in which the fingers 114 are circumferentially out of alignment with the receptacle slots 52 and 54. Mutually cooperating stops comprising surfaces forming the ends of a stop slot 140 in the mounting plate 110 and a roll pin 142 lodged in the backing plate 88 may be provided to prevent accidental over travel of the mounting plate 110.

An alternative apparatus for rotating the mounting plate is illustrated in FIG. 7. Here a mounting plate, designated 110A, has a depending lug driven by an air actuator 144 which can be mounted on the support arm (not shown in FIG. 7). The operation of this embodiment will be apparent from the description of the operation of the preferred embodiment of FIG. 1. It will be realized that the use of the air actuator 144 in FIG. 7 may obviate the use of the detents and stops described above.

In operation of the preferred embodiment of FIG. 1, after the tooling assembly is retracted from the stator 10, another stator is positioned in the lead connect station. During this time, the rotatable assembly 84 remains in its clockwise rotated position illustrated in FIG. 6 under the influence of the horizontally spaced detent plungers 134 and recesses 136. The tooling assembly 80 is then advanced toward the new stator in the lead connect station until the wire guide fingers 114 are substantially coplanar with the bottoms of the receptacle slots. At this time, the robot end effector is manipulated to rotate the rotatable assembly 84 in a counterclockwise direction to return it to the position illustrated in FIG. 2 wherein the fingers are simultaneously brought into circumferential alignment with the bottoms of the receptacle slots. The robot end effector 66 is then manipulated to sequentially insert each of the lead wires into the receptacle slots. In each case, after a lead wire is gripped by the end effector 66, the end effector 66 is moved to remove the lead wire from its temporary clamp, and also moved axially, circumferentially, and radially as needed to course the lead wire over the wire guide finger and into its associated receptacle. The lead wire is then trimmed by operation of the cutter associated with the end effector 66. The foregoing operations of the end effector 66 are conventional and are deemed apparent from an inspection of FIGS. 2, 3 and 4. When these operations are completed for the first lead wire, the robot moves onto the next lead wire to be inserted into its terminal receptacle. During this time, the rotatable assembly remains in its counterclockwise rotated position shown in FIG. 2 under the influence of the vertically aligned detent plungers 130 and recesses 132. After all four lead wires are thus connected to their respective terminal receptacles, the end effector 66 is moved to engage the left side of the lug (as viewed in FIGS. 2 and 6) and push it to the right so that the wire guide fingers 124 are moved out of circumferential alignment with the receptacle slots 52 and 54 as described above. At this time, the end effector 66 is moved to an out-of-the-way location and the tooling assembly 80 again retracted. As is apparent, these operations can be repeated indefinitely.

It will be noted that the entire tooling assembly 80 has a width which is sufficiently small that it can fit within the ambit of the stator 10 between the terminal boards 34 and 36 and so as not to interfere with the operation of the robot end effector 66.

Although the presently preferred embodiments of this invention have been described, it will be understood that within the purview of this invention various changes may be made within the scope of the appended claims.

Having thus described my invention, I claim:

1. A method for manufacturing a stator having a stator core having an end face with plural, terminal-receiving receptacles extending axially of said stator core and adapted to receive stator coil lead wires, each of said receptacles having a mutually spaced pair of slots into which one of said lead wires is inserted, said stator further having plural lead wires, each said lead wire having a fixed end extending from a stator coil wound on said stator core and a free end releasably held by a clamp so that it extends alongside its associated said receptacle, the manufacturing of said stator including one manufacturing stage during which said stator coil lead wires are removed from said clamps and extended into said receptacles and a later manufacturing stage during which terminals are inserted into said receptacles and into engagement with said lead wires, said method comprising the steps during said one manufacturing stage of:

locating said stator in a predetermined position;

positioning a wire guide finger adjacent one of said receptacles in the path of the lead wire to be inserted into said one receptacle, said wire guide finger being mounted on a guide member that is moved into a position for guiding said lead wire into said one receptacle when said finger is positioned adjacent said one receptacle;

gripping said lead wire intermediate said clamp and said coil by a pliers-like robot end effector;

moving said end effector to remove said lead wire from said clamp and to extend said lead wire over said finger and into said one receptacle so that said finger is located between the segment of said lead wire engaged by it and said one receptacle; and removing said finger from between said lead wire and said one receptacle.

2. A method for manufacturing a stator having a stator core having an end face with plural, terminal-receiving receptacles extending axially of said stator core and adapted to receive stator coil lead wires, each of said receptacles having a mutually spaced pair of slots into which one of said lead wires is inserted, said stator further having plural lead wires, each said lead wire having a fixed end extending from a stator coil wound on said stator core and a free end releasably held by a clamp so that it extends alongside its associated said receptacle, the manufacturing of said stator including one manufacturing stage during which said stator coil lead wires are removed from said clamps and extended into said receptacles and a later manufacturing stage during which terminals are inserted into said receptacles and into engagement with said lead wires, said method comprising the steps during said one manufacturing stage of:

locating said stator in a predetermined position;

positioning a wire guide finger adjacent one of said receptacles in the path of the lead wire to be inserted into said one receptacle, said wire guide finger being mounted on a rotatable plate and said positioning step including rotating said plate in a first direction;

gripping said lead wire intermediate said clamp and said coil by a pliers-like robot end effector;

moving said end effector to remove said lead wire from said clamp and to extend said lead wire over said finger and into said one receptacle so that said finger is located between the segment of said lead wire engaged by it and said one receptacle; and removing said finger from between said lead wire and said one receptacle, said removing step including rotating said plate in a second direction opposite said first direction.

3. The method of claim 2 wherein said rotatable plate is rotatable about an axis coincident with the center axis of the bore of said stator.

4. The method of claim 2 wherein said plate is rotated by manipulations of said end effector.

5. The method of claim 2 wherein said plate is rotated by an air cylinder-operated mechanism.

6. The method of claim 2 wherein said finger projects from a guide member that is moved into a position for guiding said lead wire into said one receptacle when said finger is positioned adjacent said one receptacle.

7. A method for manufacturing a stator having a stator core having an end face with plural, terminal-receiving receptacles extending axially of said stator core and adapted to receive stator coil lead wires, each of said receptacles having a mutually spaced pair of slots into which one of said lead wires is inserted, said stator further having plural lead wires, each said lead wire having a fixed end extending from a stator coil wound on said stator core and a free end releasably held by a clamp so that it extends alongside its associated said receptacle, the manufacturing of said stator including one manufacturing stage during which said stator coil lead wires are removed from said clamps and extended into said receptacles and a later manufacturing stage during which terminals are inserted into said receptacles and into engagement with said lead wires, said method comprising the steps during said one manufacturing stage of:

locating said stator in a predetermined position;

positioning a wire guide finger adjacent one of said receptacles in the path of the lead wire to be inserted into said one receptacle, said one of said receptacles having mutually spaced and parallel sidewalls with mutually aligned slots for receiving a lead wire and said positioning step including positioning said finger closely adjacent one of said sidewalls adjacent the axially innermost end of the one of said slots therein so that said lead wire can engage the bottoms of said slots;

gripping said lead wire intermediate said clamp and said coil by a pliers-like robot end effector;

moving said end effector to remove said lead wire from said clamp and to extend said lead wire over said finger and into said one receptacle so that said finger is located between the segment of said lead wire engaged by it and said one receptacle; and removing said finger from between said lead wire and said one receptacle.

8. A method for manufacturing a stator having a stator core having an end face with plural, terminal-receiving receptacles extending axially of said stator core and adapted to receive stator coil lead wires, each of said receptacles having a mutually spaced pair of slots into which one of said lead wires is inserted, said stator further having plural lead wires, each said lead wire having a fixed end extending from a stator coil wound on said stator core and a free end releasably held by a clamp so that it extends alongside its associated said receptacle, the manufacturing of said stator including one manufacturing stage during which said stator coil lead wires are removed from said clamps and extended into said receptacles and a later manufacturing stage during which terminals are inserted into said receptacles and into engagement with said lead wires, said method comprising the steps during said one manufacturing stage of:

locating said stator in a predetermined position;

providing plural wire guide fingers, one for each receptacle; and carrying out following steps with respect to each receptacle and each lead wire:

positioning one of said wire guide fingers adjacent the associated one of said receptacles in the path of the lead wire to be inserted into said associated one receptacle;

gripping said lead wire intermediate said clamp and said coil by a pliers-like robot end effector;

moving said end effector to remove said lead wire from said clamp and to extend said lead wire over said one finger and into said associated one receptacle so that said one finger is located between the segment of said lead wire engaged by it and said associated one receptacle; and removing said one finger from between said lead wire and said associated one receptacle.

9. The method of claim 8 wherein said fingers are mounted on guide members that are moved into positions for guiding said lead wires into said receptacles when said fingers are positioned adjacent said receptacles.

10. The method of claim 8 wherein said fingers are mounted on a rotatable plate, and wherein said positioning step and said removing step include rotating said plate in respectively opposite directions.

11. The method of claim 10 wherein said rotatable plate rotates about an axis coincident with the center axis of the bore of said stator.

12. The method of claim 10 wherein said plate is rotated by manipulations of said end effector.

13. The method of claim 10 wherein said plate is rotated by an air cylinder-operated mechanism.

14. The method of claim 10 wherein said fingers are mounted on guide members that are moved into positions for guiding said lead wires into said receptacles when said fingers are positioned adjacent said receptacles.

15. The method of claim 8 wherein each of said receptacles has mutually spaced and parallel side walls with mutually aligned slots for receiving the associated said lead wire, and wherein said each associated said finger is positioned closely adjacent one of said side walls adjacent the axially innermost end of the one of said slots therein so that the associated said lead wire can engage the bottoms of said slots.

16. A method for manufacturing a stator having a stator core having an end face with plural, terminal-receiving receptacles extending axially of said stator core and adapted to receive stator coil lead wires, each of said receptacles having a mutually spaced pair of slots into which one of said lead wires is inserted, said stator further having plural lead wires, each said lead wire having a fixed end extending from a stator coil wound on said stator core and a free end releasably held by a clamp so that it extends alongside its associated said receptacle, the manufacturing of said stator including one manufacturing stage during which said stator coil lead wires are removed from said clamps and extended into said receptacles and a later manufacturing stage during which terminals are inserted into said receptacles and into engagement with said lead wires, said method comprising the steps during said one manufacturing stage of:

locating said stator in a predetermined position;

positioning a wire guide finger adjacent one of said receptacles in the path of the lead wire to be inserted into said one receptacle, said wire guide finger being mounted on a mounting plate and said positioning step including moving said mounting plate linearly toward said stator to insert said finger into the bore of said stator;

gripping said lead wire intermediate said clamp and said coil by a pliers-like robot end effector;

moving said end effector to remove said lead wire from said clamp and to extend said lead wire over said finger and into said one receptacle so that said finger is located between the segment of said lead wire engaged by it and said one receptacle; and removing said finger from between said lead wire and said one receptacle, said removing step including moving said mounting plate linearly away from said stator to retract said finger from the bore of said stator.

17. The method of claim 16 wherein said mounting plate is rotatably mounted about an axis coincident with the axis of the bore of said stator, wherein said positioning step includes rotating said mounting plate in a first direction to circumferentially align said finger with said one receptacle after said finger is inserted into the bore of said stator, and wherein said removing step includes rotating said mounting plate in a second direction opposite to said first direction to move said finger out of circumferential alignment with said one receptacle before retracting said finger from the bore of the stator.

18. The method of claim 17 wherein said finger projects from a guide member mounted on aid mounting plate, which guide member is moved into a position for guiding said lead wire into said one receptacle when said finger is positioned adjacent said one receptacle.

19. The method of claim 17 wherein plural fingers are provided, one for each of said receptacles, and wherein said positioning and removing steps are carried out simultaneously with respect to each receptacle and each lead wire by moving said mounting plate, and said gripping and moving steps are carried out separately with respect to each receptacle and each lead wire by sequential movements of said end effector.

20. Apparatus for manufacturing a stator having a stator core having an end face with plural, terminal-receiving receptacles extending axially of said stator core and adopted to receive stator coil lead wires, each of said receptacles having a mutually spaced pair of slots into which one of said lead wires is inserted, said stator further having plural lead wires, each said lead wire having a fixed end extending from a stator coil wound on said stator core and a free end releasably held by a clamp so that it extends alongside its associated said receptacle, the manufacturing of said stator including one manufacturing stage during which said stator coil lead wires are removed from said clamps and extended into said receptacles and a later manufacturing stage during which terminals are inserted into said receptacles and into engagement with said lead wires, said apparatus comprising:

a tooling assembly comprising:
a fixed subassembly;
a rotatable subassembly rotatably mounted on said fixed subassembly, said rotatable subassembly comprising a wire guide finger constructed to be positioned in the path of a lead wire extending from one of said stator cores to its associated receptacle;
a drive mechanism that moves said support member between a first position in which said finger is within the bore of the stator and a second position in which said finger is retracted from the bore of the stator;
means for rotating said rotatable subassembly when said finger is within the bore of the stator back and forth from a first position in which said finger is circumferentially misaligned with said receptacle to a second position in which said finger is circumferentially aligned with said receptacle in preparation for the placing of a coil lead wire into said receptacle, and for reversely rotating said rotatable subassembly in order to remove said finger from between said receptacle and said lead wire after said lead wire is extended over said finger into said receptacle; and
a robot having an end effector that extends said lead wire over said finger and into said receptacle before said subassembly is reversely rotated to remove said finger from between said receptacle and said lead wire.

21. The apparatus of claim 20 wherein said rotatable subassembly comprises plural, mutually spaced fingers which are simultaneously positioned in bore of the stator and simultaneously moved, by rotation of said rotatable subassembly, into and then out of circumferential alignment with their respective associated receptacles.

22. The apparatus of claim 20 wherein detent mechanisms cooperate between said non-rotatable subassembly and said rotatable subassembly that frictionally retain said rotatable subassembly in the respective first and second positions thereof.

23. The apparatus of claim 20 wherein said rotatable subassembly comprises a mounting plate rotatably mounted on said fixed subassembly, plural wire guides mounted on said mounting plate, said wire guides having wire guide surfaces located to guide the coil lead wires into the receptacles when said fingers are located in the bore of the stator in circumferential alignment with said receptacles, and wherein said fingers project laterally from said wire guides in axially spaced relation to said guide surfaces.

24. The apparatus of claim 23 wherein said wire guides are provided with keys and said mounting plates have key slots for receiving said keys, said keys and said key slots preventing said wire guides from moving laterally away from said mounting plate and wherein said fixed subassembly has mutually confronting surfaces on opposite sides of said mounting plate that prevent said wire guides from moving axially away from said mounting plate.

25. The apparatus of claim 20 wherein said means for rotating said rotatable subassembly comprises an air cylinder driven mechanism.

26. The apparatus of claim 20 wherein said means for rotating said rotatable subassembly comprises a pair of oppositely facing surfaces on said rotatable assembly located to be engaged and driven in respective opposite directions by said robot end effector.

27. The apparatus of claim 23 wherein said non-rotatable subassembly comprises a support member, a nosepiece connected to said support member, and a hub extending between said nosepiece and said support member, said mounting plate being rotatably mounted on said hub.

28. The apparatus of claim 27 wherein said non-rotatable subassembly further comprises a tooling backing plate mounted on said support plate, said backing plate having a non-circular through-bore, and wherein said hub has a rear end section having a non-circular configuration adapted to extend through said through-bore, said hub having a shoulder that engages the forward face of said backing plate and said hub having such a length that said nosepiece is sufficiently spaced from said backing plate that said mounting plate is not prevented thereby from rotating.

29. The apparatus of claim 27 wherein cooperating stops are provided on said non-rotatable subassembly and said rotatable subassembly to prevent excessive rotation of said rotatable subassembly.

30. The apparatus of claim 29 wherein said stops comprise surfaces that a slot in said mounting plate and a pin projecting forwardly from said backing plate into said last mentioned slot.

31. The apparatus of claim 26 wherein the axis of said hub is coincident with the center axis of the bore of the stator.

32. The apparatus of claim 26 wherein said support member is driven by an air actuator toward and away from said stator.

* * * * *